March 19, 1946.  D. G. C. HARE  2,397,071
RADIATION DETECTOR
Filed Sept. 27, 1941  2 Sheets-Sheet 1

D. G. C. HARE
INVENTOR
R. I. Dearborn
Daniel Stryker
BY
HIS ATTORNEYS

March 19, 1946.  D. G. C. HARE  2,397,071
RADIATION DETECTOR
Filed Sept. 27, 1941  2 Sheets-Sheet 2

D.G.C.HARE
INVENTOR
BY
HIS ATTORNEYS

Patented Mar. 19, 1946

2,397,071

UNITED STATES PATENT OFFICE 2,397,071

RADIATION DETECTOR

Donald G. C. Hare, Houston, Tex., assignor, by mesne assignments, to The Texas Company, New York, N. Y., a corporation of Delaware Application September 27, 1941, Serial No. 412,617

9 Claims. (Cl. 250—83.6)

This invention relates to the detecting and measurement of penetrative radiation and more particularly to a device of the Geiger-Muller counter type for measuring the intensity of such radiation as gamma rays.

The principal object of the invention is to provide a device of this type which will have an efficiency much higher than the ordinary or conventional Geiger-Muller counter, which will be relatively simple to manufacture and which will be sufficiently rugged to enable it to be used in comparatively rough service such, for instance, as in the logging of wells or bore holes.

In the co-pending patent application of myself and another filed November 2, 1940, Serial No. 364,020, there is disclosed a device for the detecting of penetrating radiation such as gamma rays, which device has an efficiency many times that of the devices known to the prior art. The present invention relates to a device of this type having the advantages of high efficiency and stable operation of the device of the aforementioned co-pending application and also other advantages not inherent in the device disclosed in that application. Of particular value is the simplification of construction and an increased ruggedness resulting from much larger permissible manufacturing tolerances.

In accordance with the invention, a radiation detecting device is formed preferably of one or more conducting cathode plates, in the surface of which one or more holes have been formed to allow the passage of fine anode wires in a direction which may be substantially perpendicular to the plane of the plates. If but one cathode plate is used, this may be formed in one of several different shapes. For example, the cathode plate may be formed as a spiral ribbon or band or in a zigzag or accordion-pleated shape. If a plurality of plates are used, they may be arranged substantially parallel to each other and separated a relatively small distance, and in this case the plates are so oriented that the holes of the plates are in alignment so that an anode wire can be disposed substantially through the center of each series of holes. The device comprising the cathode and the anode is housed in an envelope of glass, metal or other suitable material, the envelope being preferably filled with a suitable gas. In one embodiment of the invention the anode wire is disposed within a thin-walled metallic tube which is passed through the holes in electrically non-conducting cathode plates.

For a better understanding of the invention reference may be had to the accompanying drawings in which Fig. 1 is a diagrammatic view of a Geiger-Muller counter of the conventional type;

Figure 1:
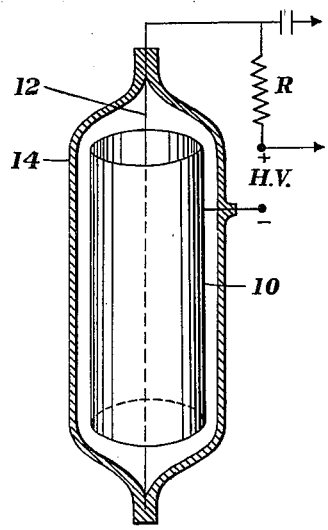

The conventional Geiger-Muller counter shown in Fig. 1 consists of a thin-walled metal tube 10 with a very thin wire, comprising the anode 12, spanned axially and insulated from the metal tube forming the cathode. These electrodes are enclosed in an envelope 14, commonly a glass tube, which contains a suitable gas, e. g. argon, at a fairly low pressure, say 5–10 cm. of mercury. The central wire 12 is maintained at a positive potential with respect to the cylinder, and a fairly high resistance R is placed in the circuit. Normally the potential difference between the cathode 10 and wire 12 is nearly but not quite high enough to cause a discharge to take place. If a particle capable of ionizing the gas passes through the cylinder 10, a discharge will take place with a current flow of the order of a few microamperes. This causes a large voltage drop across R and the discharge will cease after a very short period of time. By suitably amplifying the sudden voltage drop across R, a mechanical recorder or other device capable of registering the discharge of the counter may be actuated. Suitable treatment of the surface of the cylinder 10 and proper choice of the gas or gases filling the counter will cause the discharge to stop more quickly and reliably. After the discharge has ceased, the counter is again in a condition to register the passage of an ionizing particle.

Because of the large ionization per unit path length of such radiation as cosmic or beta rays, even in the relatively low density of the gas in the counter, the efficiency of the conventional counter for such rays is very nearly 100%. However, the probability of a gamma ray causing ionization in the gas is almost vanishingly small, and practically all the counts due to the passage of gamma rays are due to the electrons ejected from the cathode wall 10 by the interaction of the gamma ray with the atoms of the cathode material. The probability of such an interaction taking place will, of course, increase with increasing cathode-wall thickness, but since the range in the cathode material of an electron receiving energy from the gamma ray is seldom greater than one- or two-tenths of a millimeter, nothing is to be gained by making the wall 10 thicker than about twice the average range of the particles. At this thickness about one out of every one hundred gamma rays traversing the cathode will eject an electron so as to "trigger" or discharge the counter. This probability or efficiency is somewhat dependent on the material used as the cathode 10 and on the amount of surface exposed, but all these factors will not cause any variation of efficiency by more than a factor of about two from that of a simple counter with the optimum wall thickness. It is to be pointed out that the efficiency is practically independent of the size of the counter, a very small counter having nearly the same optimum efficiency as a very large one.

We define the efficiency of a counter as the ratio of the number of counts to the number of rays traversing the cathode area. For a parallel beam of gamma rays one can, of course, increase this ratio by using several counters, one behind the other and connected in parallel. If we have N counters, each with an efficiency E, the efficiency of the combination would be nearly NE. However, a parallel beam of gamma rays is a practical impossibility and does not occur in nature.

Figure 2:
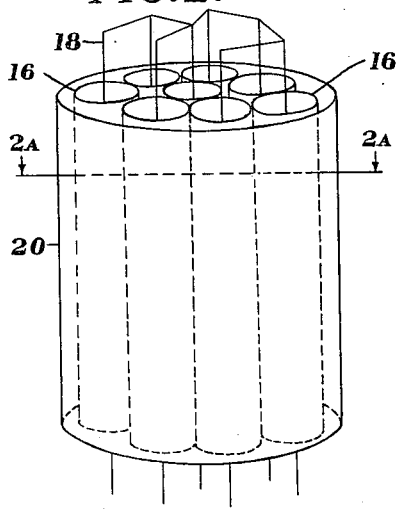
Fig. 2 shows one arrangement of a group of conventional counters and Fig. 2a is a sectional view on line 2a—2a of Fig. 2.
Figure 2A:
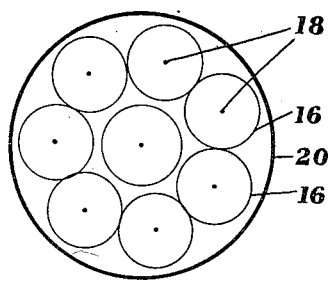

Another obvious way of obtaining a higher efficiency in a given counter volume is to replace the single large counter with a bundle of small counters which may be arranged as shown in Figs. 2 and 2a. These figures show a bundle of eight small counters having cathodes 16 and anodes 18 arranged within an envelope 20. The cylinders 16 are connected together electrically to form the cathode, while the wires 18 are connected electrically to form the anode. However, unless the lateral cross-section of the available counter volume is very large it is not possible to get a very large gain in efficiency unless one uses a large number of very small counters. For example, if we have a lateral cross-section 3 inches in diameter, we could use seven 1-inch counters which would give us an increase in efficiency by a factor of seven-thirds. In order to get an increase in efficiency by a factor of ten it would be necessary to use over 120 counters, each one smaller than one-quarter inch in diameter. It is extremely difficult to secure the necessary uniformity of operation with such a large number of thin-walled tubes and the difficulties encountered will quite obviously increase rapidly with the length of the counter.

In Figures 2 through 9 the housing or envelope has been omitted in order to simplify the drawing. It is understood that each of the devices shown in these figures will be housed in a suitable casing or glass envelope which may be similar to the envelope 14 of Fig. 1.

Figure 3:
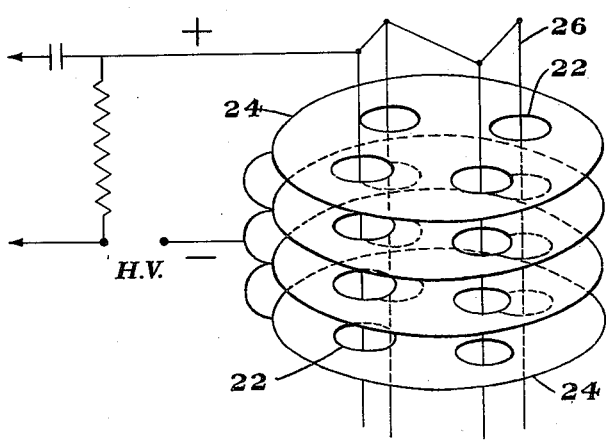
Fig. 3 is a diagrammatic representation of one embodiment of the invention.
Figure 4:
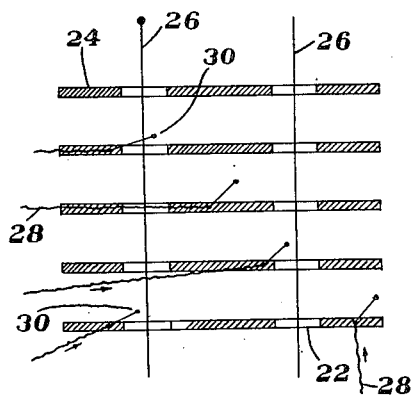
Figs. 4 and 5 are, respectively, a vertical elevation and a plan view of the embodiment of Fig. 3.
Figure 5:
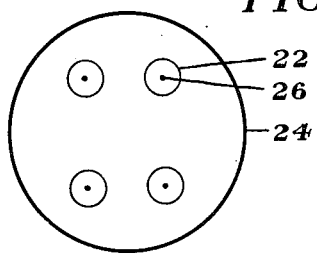

In Figs. 3, 4 and 5 an embodiment of the invention is shown in which the conventional counter cathode tube has been replaced electrically by properly aligned plate holes 22 formed in a plurality of plate members 24 shown as being arranged substantially parallel to each other and in separated relation. The plate members 24 are connected electrically to form the cathode while the wires 26 passing through the holes 22 are connected together to form the anode. That the normal cathode tube can be replaced by the plate holes is obvious if we consider the fact that if we leave no space between the plates, this counter becomes a group of conventional counters with very thick walls and it is also apparent that if the spacing between the plates 24 is small compared to the diameter of the holes 22, there will be very little electrical difference between this and the conventional counter. Actually it has been found, however, that the counter will function satisfactorily with only one plate present. The electrical characteristics of such a counter using a plurality of plates are very similar to those of a conventional counter whose diameter is that of the plate holes and whose gas filling is the same. From the standpoint of efficiency, however, this new type of counter offers a great improvement over the conventional counter, as will be made clear by reference to Fig. 4 and the following discussion.

As has previously been pointed out, the probability of a gamma ray causing ionization in the gas filling of the counter is extremely small and for a gamma ray to trip the counter it is practically always necessary that the gamma ray interact with the matter of the cathode with the consequent ejection of an electron. The probability of such interaction taking place increases with the increasing thickness of the cathode wall, but due to the short range of the ejected electrons in the cathode material in a conventional counter, we are limited to a cathode thickness of the order of less than 1 mm. Referring, however, to the present invention as depicted in Fig. 4, we see that there is an opportunity for the gamma rays 28 to pass through a large amount of cathode material with a consequent high probability of interaction, together with a good probability that the ejected electron 30 will not have to travel too great a distance in the cathode 24 before getting out. Because of this factor of offering a large matter path for the gamma ray with a short path for the ejected electron (which has been disclosed and is a matter of record in connection with the aforementioned co-pending patent application, Serial No. 364,020), it is seen then that each unit which may be thought of as one anode wire passing through a series of holes will appear from the standpoint of efficiency to act like a conventional counter many times the diameter of the holes. Actually it has been found that counters of this type in which each cathode plate of one inch external diameter has a single hole of $\frac{1}{16}$ inch diameter with a plate spacing of approximately $\frac{1}{16}$ inch gave the same number of counts per second as a conventional counter 1⅜ inches in diameter, when both were exposed to the same radiation. Consequently, if one makes a relatively small number of reasonably small sized holes in the plates, the resulting counter will have an efficiency which could be achieved in the same form by a bundle of conventional counters only by using an unreasonably large number of very small counters.

Figure 6:
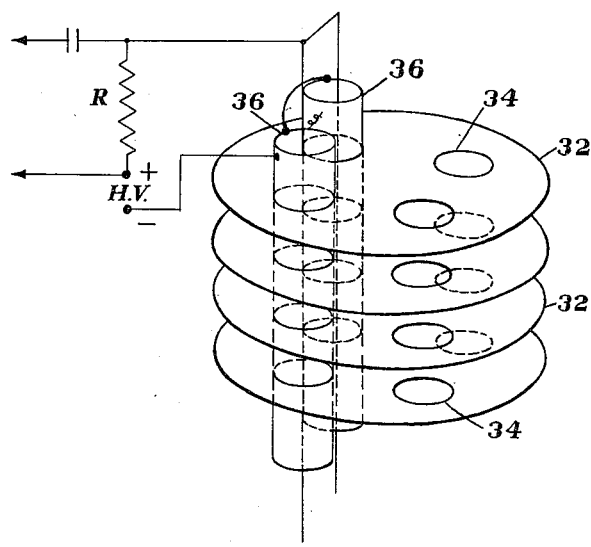
Fig. 6 is a diagrammatic representation of another form of the invention.

For certain conditions of plate spacing or where for various reasons it may be desirable to make the cathode plates of non-conducting materials, the embodiment of the invention shown in Fig. 6 may be used. Here the counter consists of a plurality of electrically non-conducting plates 32 in which holes 34 have been made and through which holes have been placed very thin-walled electrically conducting cathode tubes, two of which are shown at 36. The walls of these tubes are thin enough, i. e. a small fraction of millimeter, to allow the passage of electrons ejected from the plates 32 by the gamma rays with little loss of energy. The function of these tubes 36 is primarily to produce a suitable electric field, nearly all the ejected electrons coming from the plates through which the tubes have been passed.

Figure 7:
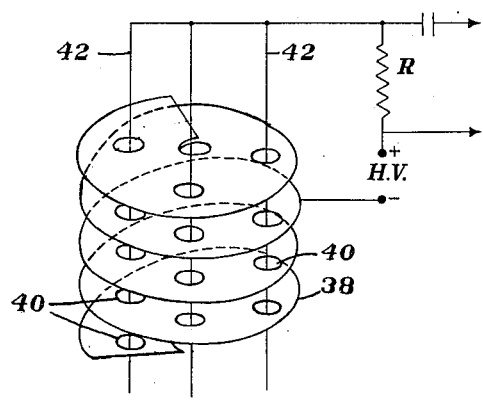

Instead of using a plurality of spaced, substantially parallel plates connected together to form the cathode, this element can be formed in other ways to minimize construction costs. In Fig. 7 is shown a single cathode plate 38 formed in the shape of a spiral and provided with a plurality of holes 40 arranged so that wires 42 can be passed through the aligned holes. The wires 42 are, of course, connected together to form the anode.

Figure 8:
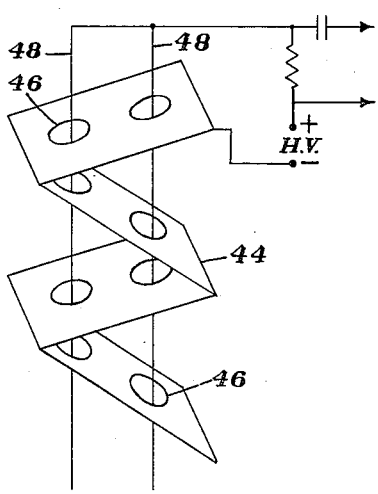
Figs. 7 and 8 are diagrammatic views showing two other forms of cathodes.

In Fig. 8 a single cathode plate 44 is shown as having been formed in a zigzag or pleated shape and provided with holes 46 arranged in alignment so that the anode wires 48 can be passed through them as is illustrated.

Figure 9:
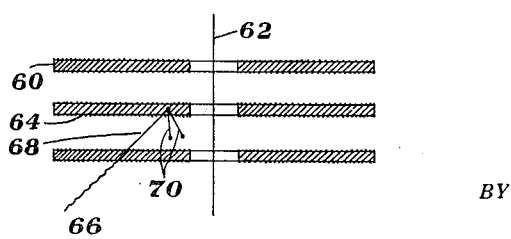
Fig. 9 is a diagrammatic view illustrating a modification in which the plates are coated with a photo-sensitive material.

It has been found that the efficiency of a multiple plate detector can be increased by providing a photosensitive surface on the cathode plates. In Fig. 9 a simple detector is illustrated as having three cathode plates 60 and one anode wire 62. The surfaces of the cathode plates are covered with a photo-sensitive material 64. A gamma ray 66 shown as penetrating the bottom plate 60 may cause a primary electron 68 to be ejected in such a direction that the electron might enter the middle cathode plate 60 and stop and without causing ionization of the gas within the counter. However, when the primary electron 68 strikes the photo-sensitive surface 64, a plurality of secondary electrons 70 will be produced with a good possibility that one of the electrons will cause ionization to trip the counter.

For certain applications, such as the well logging method disclosed in my copending application, Serial Number 337,862, it may be desirable to detect radiation which itself is ordinarily non-ionizing, such as slow neutrons. This is commonly done by using a counter whose cathode is of a material which disintegrates or becomes radioactive under slow neutron bombardment with consequent emission of ionizing particles. Such a substance is boron, which commonly occurs in the form of borax. It is believed obvious that the counter herein described may be applied to this use by using plates of suitable material, or by coating the plates with a suitable substance such as a lithium or boron compound. It is to be pointed out that if the conventional counter cathode is thus coated, serious difficulties of operation may ensue, particularly if the coating is a non-conductor, or is not smooth. In the case of the new counter herein described, the active field is confined to a very small region about the holes, and thus any type of material or coating outside this area will not affect its operation. If desired, these counters can be operated at a voltage somewhat lower than the normal threshold and will then respond in a manner proportional to the ionization produced by the particle passing through the sensitive region. This allows the detection of, say, alpha particles ejected by the disintegration produced by slow neutrons, even in the presence of a large gamma-ray background, since an alpha particle will cause a very much greater ionization than will the beta particles due to the gamma-rays.

Obviously many modifications and variations of the invention, as hereinbefore set forth, may be made without departing from the spirit and scope thereof and, therefore, only such limitations should be imposed as are indicated in the appended claims.

I claim:

1. A device of the Geiger counter type for detecting gamma radiation comprising a metallic plate member forming a cathode, said plate being provided with at least one hole, and an anode member comprising a wire extending through said hole and insulated from said cathode plate.

2. A radiation detecting device comprising a plurality of plates disposed in separated relation and connected together electrically to form a cathode member, each plate being provided with at least one hole and the holes in the plates being disposed in alignment, and an anode member comprising a wire extending through said aligned holes and insulated from said cathode plates.

3. A device for detecting gamma radiation comprising a cathode formed of a spiral plate, said plate being provided with a plurality of series of holes, the holes in each series being arranged in alignment and an anode formed of a wire disposed axially through each series of holes and electrically insulated from said plate.

4. A device for detecting gamma radiation comprising a cathode plate formed in a zigzag shape, said plate being provided with a series of holes extending longitudinally through the sloping elements of the plate, and an anode wire extending through said hole.

5. A device for detecting gamma ray radiation comprising a plurality of plates arranged in a parallel bank and connected together electrically to form a cathode, the plates being separated slightly to form spaces therebetween and said bank of plates being provided with a plurality of holes disposed in parallel lines extending transversely through said bank, and an anode wire extending through each line of said holes, said wires being connected together electrically to form an anode.

6. A radiation detecting device comprising a cathode section having a plurality of substantially lateral, metallic plate-like portions, each of said portions being provided with at least one hole and the holes being disposed in alignment, and an anode member comprising a wire extending longitudinally through the centers of said aligned holes and insulated from said cathode section.

7. A device for determining gamma ray radiation comprising a plurality of plates arranged in a parallel bank and connected together to form a cathode, the plates being separated slightly to form spaces therebetween, said bank of plates being provided with a plurality of holes disposed in parallel lines extending transversely through the bank, and an anode wire extending through each line of said holes.

8. A radiation detecting device comprising a plurality of plates disposed in separated, parallel relation and connected together electrically to form a cathode member, and a plurality of anode wires disposed in parallel, separated relation and traversing the planes of said cathode plates.

9. A radiation detecting device comprising a plurality of plates disposed in separated, parallel relation and connected together electrically to form a cathode member, and a plurality of wires disposed in parallel, separated relation and intersecting the planes of said plates, said wires being insulated from said plates and connected together electrically to form an anode member.

DONALD G. C. HARE.